US009410482B2

(12) United States Patent
Krautheim et al.

(10) Patent No.: US 9,410,482 B2
(45) Date of Patent: Aug. 9, 2016

(54) GAS TURBINE ENGINE HEAT EXCHANGER

(75) Inventors: Michael Stephen Krautheim, Fountaintown, IN (US); Carlos Soto-Gonzalez, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 548 days.

(21) Appl. No.: 13/336,378

(22) Filed: Dec. 23, 2011

(65) Prior Publication Data

US 2012/0159961 A1 Jun. 28, 2012

Related U.S. Application Data

(60) Provisional application No. 61/427,131, filed on Dec. 24, 2010.

(51) Int. Cl.
*F02C 7/052* (2006.01)
*F02K 3/06* (2006.01)
*F02K 3/115* (2006.01)
*F02C 7/141* (2006.01)

(52) U.S. Cl.
CPC ............... *F02C 7/052* (2013.01); *F02C 7/141* (2013.01); *F02K 3/06* (2013.01); *F02K 3/115* (2013.01); *F05D 2260/607* (2013.01); *Y02T 50/675* (2013.01)

(58) Field of Classification Search
CPC ............ F02C 6/08; F02C 7/052; F02C 7/143; F02C 9/18; F02C 7/141; F02C 7/14; F02C 9/1833; F05D 2260/607; B64D 2033/0246; F02K 3/06; F02K 3/115; Y02T 50/675

USPC .................... 60/782, 785, 728, 39.02; 55/306
See application file for complete search history.

(56) References Cited

U.S. PATENT DOCUMENTS 3,842,597 A * 10/1974 Ehrich .......................... 60/226.1
3,896,875 A    7/1975 Bolger
(Continued)

FOREIGN PATENT DOCUMENTS

EP            1978222           8/2008

OTHER PUBLICATIONS

United States Army Aviation Warfighting Center, UH-60A T700 Engine, 2007, pp. D-13 to D-29.*

(Continued)

*Primary Examiner* — Phutthiwat Wongwian
*Assistant Examiner* — Jason H Duger
(74) *Attorney, Agent, or Firm* — Fishman Stewart PLLC

(57) ABSTRACT

A gas turbine engine having a heat exchanger is disclosed. In one form the gas turbine engine includes a particle separator that can be used to separate particles or foreign objects and create a dirty flow and a clean flow. A blower can be used to discharge the particles or foreign objects from the separator. The heat exchanger includes a relatively warm flow path from a downstream region of a compressor and a relatively cool flow path from an upstream region of the compressor. The relatively cool flow path is merged with the dirty flow. In another embodiment, the gas turbine engine is a turbofan and the relatively cool flow path is merged with a bypass flow. In one embodiment of the engine the relatively warm flow path, after having exchanged heat with the relatively cool flow path is delivered to a working component without passing through a turbomachinery component.

10 Claims, 1 Drawing Sheet

(56) References Cited

U.S. PATENT DOCUMENTS

| | | | |
|---|---|---|---|
| 4,002,024 A * | 1/1977 | Nye et al. ................... | 60/262 |
| 4,080,785 A | 3/1978 | Koff et al. | |
| 4,212,595 A | 7/1980 | Kuintzle, Jr. et al. | |
| 4,254,618 A * | 3/1981 | Elovic ..................... | 60/226.1 |
| 4,704,145 A * | 11/1987 | Norris et al. ................ | 55/306 |
| 4,928,480 A * | 5/1990 | Oliver et al. .............. | 60/39.092 |
| 5,095,707 A | 3/1992 | Eck | |
| 5,201,801 A * | 4/1993 | Smith, Jr. .................. | 60/226.1 |
| 5,392,614 A | 2/1995 | Coffinberry | |
| 5,414,992 A * | 5/1995 | Glickstein ................. | 60/782 |
| 5,577,381 A | 11/1996 | Eigenbrode et al. | |
| 5,581,996 A | 12/1996 | Koch et al. | |
| 5,782,077 A | 7/1998 | Porte | |
| 5,918,458 A * | 7/1999 | Coffinberry et al. ......... | 60/785 |
| 6,106,229 A | 8/2000 | Nikkanen et al. | |
| 6,134,874 A * | 10/2000 | Stoten .................. | B01D 45/16 55/306 |
| 6,134,880 A | 10/2000 | Yoshinaka | |
| 6,860,109 B2 | 3/2005 | Tsuji | |
| 7,305,842 B1 * | 12/2007 | Schiff ..................... | 62/244 |
| 7,870,721 B2 * | 1/2011 | Winter et al. .............. | 60/226.1 |
| 8,256,229 B2 * | 9/2012 | Glahn et al. ............... | 60/782 |
| 2004/0088995 A1 | 5/2004 | Reissig | |
| 2008/0314047 A1 | 12/2008 | Anderson et al. | |
| 2009/0000305 A1 | 1/2009 | Porte et al. | |
| 2009/0007567 A1 | 1/2009 | Porte et al. | |
| 2010/0074736 A1 | 3/2010 | Junod | |
| 2010/0089019 A1 | 4/2010 | Knight et al. | |
| 2010/0162682 A1 * | 7/2010 | Lerg ..................... | 60/226.1 |
| 2010/0287907 A1 * | 11/2010 | Agrawal et al. ........... | 60/39.091 |

OTHER PUBLICATIONS

International Search Report and Written Opinion, Apr. 25, 2012, PCT/US2011/067303.

Extended European Search Report, EP11850676.5, Rolls Royce Corporation, Jun. 25, 2015.

* cited by examiner

GAS TURBINE ENGINE HEAT EXCHANGER

RELATED APPLICATIONS

The present application claims the benefit of U.S. Provisional Patent Application No. 61/427,131 filed Dec. 24, 2010 which is incorporated herein by reference.

TECHNICAL FIELD

The present invention generally relates to gas turbine engines, and more particularly, but not exclusively, to heat exchangers used with gas turbine engines.

BACKGROUND

Providing gas turbine engines with heat exchangers remains an area of interest. Some existing systems have various shortcomings relative to certain applications. Accordingly, there remains a need for further contributions in this area of technology.

SUMMARY

One embodiment of the present invention is a unique gas turbine engine and heat exchanger arrangement. Other embodiments include apparatuses, systems, devices, hardware, methods, and combinations for exchanging heat between different fluid streams of a gas turbine engine and routing those streams after the exchanging heat. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
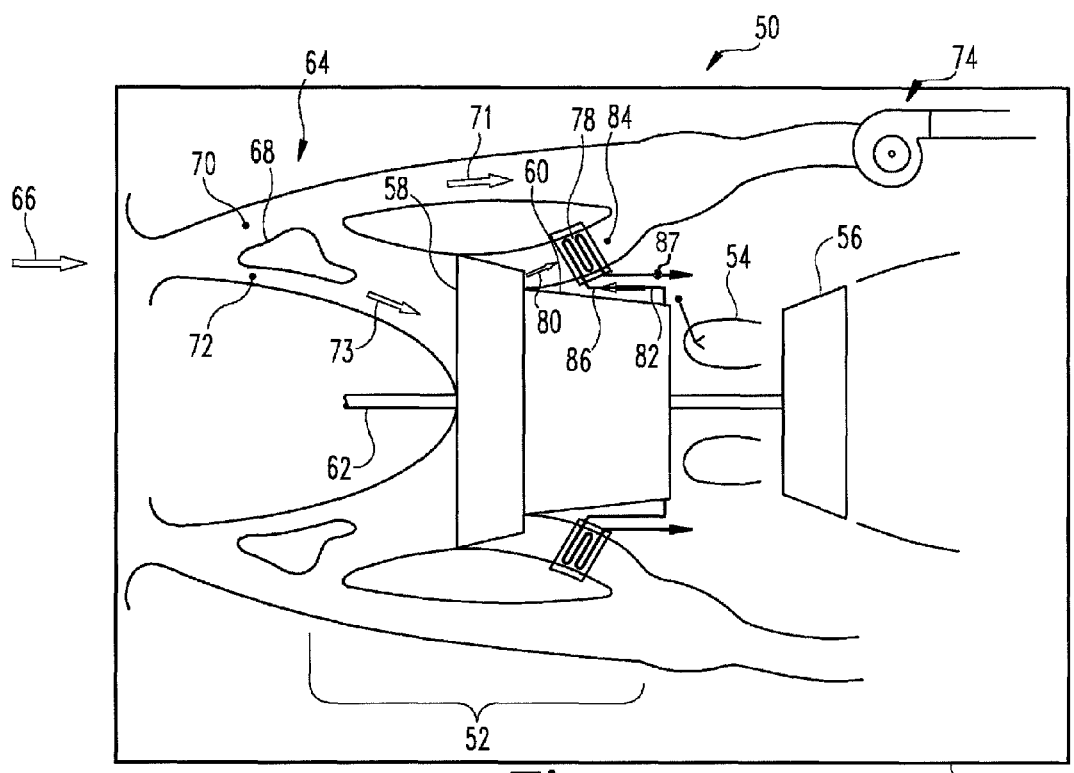
FIG. 1 depicts an embodiment of a gas turbine engine having a heat exchanger.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a gas turbine engine 50 is disclosed in the form of a turboshaft engine. In other embodiments, however, the gas turbine engine 50 can take the form of a turboprop or turbofan engine, among potential others. The gas turbine engine 50 includes a compressor 52, combustor 54, and turbine 56. In the illustrative embodiment the gas turbine engine is a multi-spool engine such that the compressor 52 includes a low pressure compressor 58 and a high pressure compressor 60. The turbine 56 can include any number of turbine sections such as a low pressure turbine and a high pressure turbine. In other embodiments, however, the gas turbine engine can be a single spool engine, or alternatively could include a greater number of spools. The gas turbine engine 50 is capable of providing power to rotate a shaft 62 which can be coupled to a variety of devices such as, but not limited to a transmission, to set forth just one non-limiting example.

In some applications the gas turbine engine 50 can be used to provide power to an aircraft 63. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, surface vehicles, weapon systems, security systems, perimeter defense/security systems, and the like known to one of ordinary skill in the art.

An engine air particle separator 64 is included in the embodiment depicted in FIG. 1 and is used to filter particulate matter and other foreign objects from an inlet air stream 66 so that a cleaned air stream is used within the rotating turbomachinery of the gas turbine engine 50. The engine air particle separator 64 can be used to completely clean or partially clean the inlet air stream 66. In one form the engine air particle separator 64 includes a body 68 used to separate a dirty flow path 70 from a clean flow path 72. As the particles and other foreign objects enter the inlet of the gas turbine engine 50 and encounter the body 68, their momentum causes some or all of the particles and other foreign objects to flow into the dirty flow path 70 thus creating a dirty flow 71. Though only configuration of the body 68 and relative geometries of the dirty flow path 70 and clean flow path 72 is shown in FIG. 1, other embodiments can include different shapes, sizes, orientations, etc. of the body 68, dirty flow path 70, and clean flow path 72. In addition, various other flow paths and bodies can be included to create the actions adequate to provide a clean air flow to the gas turbine engine 50 and remove some or all of the particles and foreign objects.

A clean flow 73 is routed to the gas turbine engine 50 and the dirty flow 71 is carried away from the gas turbine engine 50 to a particle sink 74. In one form the particle sink 74 is a device used to attract debris on its upstream side and discharge debris on its downstream side. In the illustrative embodiment the particle sink 74 is in the form of a blower 74. The blower 74 can take a variety of forms. For example, the blower 74 can be an axial fan, a centrifugal compressor, a rotary pump, or a reciprocating pump, among potential others. The blower 74 can have a variety of sizes and be capable of providing a range of mass flows, velocities, pressures, and temperatures at its exit. In some forms the blower 74 can be selectively activated and/or variably activated. The blower 74 can be positioned at a variety of locations and distances relative to any of the components of the gas turbine engine 50.

The gas turbine engine 50 also includes a heat exchanger 78 capable of exchanging heat between flow streams. In one form the heat exchanger 78 is capable of exchanging heat between a flow stream 80 and a flow stream 82. In the illustrative embodiment the flow stream 80 is conveyed in a passage 84 that extends from a downstream portion of the low pressure compressor 58. In other forms, however, the passage 84 can extend from other locations, such as other locations within the compressor 52. The flow stream 82 is conveyed in a passage 86 that extends from a downstream portion of the high pressure compressor 60. In other forms, however, the passage 86 can extend from other locations. In one form the passage 86 extends from the compressor discharge of the high pressure compressor 60.

Either or both passages 84 and 86 can have a variety of forms, orientations, and geometries. In addition, either or both passages 84 and 86 can include a variety of transitions, cross sectional areas, surface textures, and can be made of a variety of materials or combination of materials. In one non-limiting example, in the illustrative embodiment the passage 86 is shown extending into the heat exchanger 78 and being turned such as through a coil before exiting the heat exchanger 78. Unlike the passage 86, the illustrative embodiment depicts the passage 84 extending generally away from the compressor 52 without being turned, such as in passage 86, before being merged with the dirty flow path 70. In some embodiments the passage 84 can include portions that are turned similar to the coil like shape of the illustrative embodiment of passage 86. Alternatively and/or additionally, the passage 86 can extend along an axis or general direction similar to the illustrative embodiment of passage 84.

The heat exchanger 78 can include a variety of forms and have a variety of shapes, lengths, etc. for conveying the flow stream 80 and flow stream 82. The heat exchanger 78 can be made of a variety of materials and components. In one form the flow stream 80 is a relatively cool flow of the heat exchanger 78 and the flow stream 82 is a relatively warm flow of the heat exchanger 78. As is discussed below regarding the relative shape, orientation, and size of the flow paths, different embodiments of the heat exchanger 78 can have other configurations for either the relatively cool or the relatively warm flow, or both. In one form the heat exchanger 78 is structured to separately maintain the flow streams 80 and 82. Though the heat exchanger 78 is shown oriented across the passage 84, some embodiments of the heat exchanger 78 may only partially extend into the passage 84. In still other forms the heat exchanger 78 may not extend into the passage 84 but still otherwise remain in thermal communication with the flow stream 80. Any number of heat exchangers 78 can be used with the gas turbine engine 50. In one non-limiting embodiment of the gas turbine engine 50, an annular shaped passage 84 provides a flow stream 80 to numerous heat exchangers 78 disposed within the annular shaped passage 84. In another non-limiting embodiment, multiple passages 86 can be used to convey multiple flow stream 82 to separate heat exchangers 78 disposed in one or more passages 84. In short, a variety of configurations of the passages 84 and 86 are contemplated herein.

The passage 84 can be arranged to provide for a variety of flow rates, temperatures, and pressures of the flow stream 80. In some forms where the heat exchanger 78 extends into the passage 84, the passage 84 and/or the heat exchanger 78 can be arranged to provide for a variety of mass flows, velocities, temperatures, and pressures of the flow stream 80. To set forth just a few non-limiting examples, the passage 84 can be configured to provide for a variety of pressure drops and pressure ratios across the passage 84, including across the heat exchanger 78. In one non-limiting embodiment the passage 84 is a relatively static structure that does not impart work upon the flow stream 80. For example, the passage 84 can be structured such that no turbomachinery component, whether compressor or turbine, is included to either withdraw work from the flow stream 80 or impart work to the flow stream 80 before or after the flow stream passes the heat exchanger 78.

Similar to the passage 84, the passage 86 can also be arranged to provide a variety of mass flows, velocities, temperatures, and pressures. In one non-limiting embodiment the passage 86 delivers a cooled flow stream 82 to the working component downstream of location 87. The working component can include a number of components within or external of the gas turbine engine such as, but not limited to, a hot section component. The cooled flow stream 82 can be used to cool the working component. In one non-limiting embodiment the passage 86 is a relatively static structure that does not impart work upon the flow stream 82. For example, the passage 86 can be structured such that no turbomachinery component, whether compressor or turbine, is included to either withdraw work from the flow stream 82 or impart work to the flow stream 82 before being delivered to the working component.

Flow stream 80 is merged with dirty flow 71 that has been conveyed through the dirty flow path 70. In the illustrative embodiment the flow stream 80 is merged with the dirty flow 71 at a location upstream of the particle sink 74. In other embodiments, however, the flow stream 80 can be merged with the dirty flow 71 at other locations.

In operation, air flowing into the gas turbine engine 50 is cleaned of particles and/or foreign objects by an engine air particle separator before being compressed by compressor 52. One flow stream 80 is extracted from the compressor 52 at an upstream location while another flow stream 82 is extracted from the compressor 52 at a downstream location. A heat exchanger 78 is provided to exchange heat between the flow streams 80 and 82 and cool the downstream extracted flow stream 82 and warm the upstream extracted flow stream 80. The upstream extracted flow stream 80 is pulled toward a particle sink 74 just as the dirty flow 71 from the engine air particle separator 64 is pulled toward the particle sink 74. The cooled flow stream 82 can be used in a variety of applications for a variety of working components. In one form the cooled flow stream 82 is not compressed or expanded by a turbomachinery component prior to being used with the working component. The particle sink 74 can be structured to deliver the merged flow stream 80 and dirty flow 71 to locations such as, but not limited to, external of the gas turbine engine. In one form the particle sink 74 can deliver the merged flow overboard of the gas turbine engine 50 and/or the aircraft 63.

Figure 2:
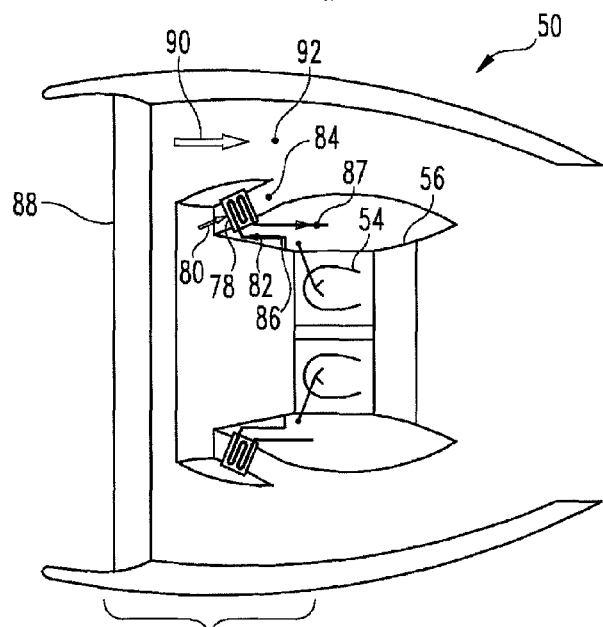
FIG. 2 depicts another embodiment of a gas turbine engine having a heat exchanger.

Turning now to FIG. 2, another embodiment of the gas turbine engine 50 is depicted in the form of a turbofan engine wherein like numerals refer to similar elements of FIG. 1. The gas turbine engine 50 includes a fan 88 capable of producing a bypass flow 90 in a bypass duct 92. The bypass flow 90 can be merged with a flow stream 80 that has exchanged heat with the flow stream 82 in passage 86. In one embodiment the flow stream 80 can be entrained with the bypass flow 90. As in the example above, in some forms the cooled flow stream 82 is not compressed or expanded by a turbomachinery component prior to being used with a working component.

One aspect of the present application provides an apparatus comprising a gas turbine engine having a particle separator for cleaning an airflow and a compressor capable of increasing a pressure of a working fluid in the gas turbine engine, the particle separator having a clean flow path and a dirty flow path, a first passageway for the conveyance of a first air flow extracted from a first source of the compressor, a second passageway for the conveyance of a second air flow extracted from a second source of the compressor, the second source downstream of the first source, and a heat exchanger separately maintaining the first air flow and second air flow and constructed such that the first air flow cools the second air flow, wherein the first air flow is routed to be merged with the dirty flow path.

One feature of the present application provides wherein the dirty flow path of the particle separator is in flow communication with a pressure attractor, the pressure attractor used to convey a dirty flow of air from the particle separator.

Another feature of the present application provides wherein the pressure attractor is a blower.

Yet another feature of the present application provides wherein the merger of the first air flow with the dirty flow of air is upstream of the blower.

Still yet another of the present application provides wherein the compressor includes a relatively low pressure compressor section and a relatively high pressure compressor section.

Another aspect of the present application provides an apparatus comprising a gas turbine engine including a compressor and a turbine rotatable about a spool axis of the gas turbine engine, the compressor having a main compressor flow path, an upstream offtake, and a downstream offtake, a rotatable flow component structured to rotate about a component axis separate from the spool axis of the gas turbine engine, the rotatable flow component operable to produce a component flow stream, a heat exchanger structured to exchange heat between a first air stream from the upstream offtake and a second air stream from the downstream offtake, and wherein during operation of the gas turbine engine the first air stream is attracted to the component flow stream.

One feature of the present application further includes a particle separator structured to deliver a cleaned air flow to the gas turbine engine and structured to deliver a dirty air flow.

Another feature of the present application provides wherein the rotatable flow component is a blower in flow communication with the particle separator.

Yet another of the present application provides wherein the blower is arranged to receive a combined stream of the first air stream and the dirty air flow.

Still another of the present application provides wherein the gas turbine engine is a multi-spool gas engine, the compressor includes a relatively low pressure compressor component and a relatively high pressure compressor component, the relatively high pressure compressor component is a high pressure compressor of a multi-spool gas turbine engine, and wherein the gas turbine engine is coupled to a vehicle and provides energy to the vehicle.

A further aspect of the present application provides an apparatus comprising a gas turbine engine and a heat exchanger operable to transfer heat between streams of the gas turbine engine, a first passageway for the passage of a relatively cool air bound for the heat exchanger, the first passageway having a first portion configured to receive a first airflow from a relatively low pressure compressor portion and deliver it to the heat exchanger, the first passageway also having a second portion configured to receive the first airflow from the heat exchanger and deliver it to a flow sink of the gas turbine engine, and a second passageway for the passage of a relatively warm air bound for the heat exchanger, the second passageway having a third portion configured to receive a second airflow that originates downstream of and at a relatively higher pressure than the first airflow, the third portion delivering the second airflow to the heat exchanger, the second passageway also having a fourth portion configured to receive the second airflow from the heat exchanger and deliver it to a working component, the third portion and the fourth portion structured to impart no work on the second airflow.

One feature of the present application provides wherein the gas turbine engine is a turbofan engine and the flow sink is a bypass of the turbofan engine.

Another of the present application provides wherein the flow sink is a flow stream of an air particle system.

Still another feature of the present application provides wherein the flow stream of the air particle system is created by a blower, the second portion delivering the first airflow to an inlet of the blower.

Yet still another of the present application provides wherein the fourth portion of the second passageway extends from the heat exchanger to the working component, the third portion and the fourth portion being static and free of a bladed rotating turbomachinery component.

A further aspect of the present application provides an apparatus comprising a gas turbine engine having an engine air particle separator, and a heat exchanger in fluid communication with a first compressor flow stream of the gas turbine engine and a second compressor flow stream, the first compressor flow stream at a lower temperature than the second compressor flow stream, and means for conveying the first compressor flow stream after the first compressor flow stream has traversed the heat exchanger.

One feature of the present application provides wherein the means for conveying the first compressor flow stream includes a blower structured to convey a dirty airflow away from the gas turbine engine.

Yet still another aspect of the present application provides a method comprising operating a gas turbine engine and generating a compressor flow from a compressor, parsing a flow stream with an air particle separator into a clean flow and a dirty flow, extracting a first portion of air from the compressor; and combining the first portion with the dirty flow prior to being exhausted overboard.

A feature of the present application provides wherein the extracting occurs at a relatively low pressure location in the compressor and which further includes withdrawing a second portion of the compressor flow at a relatively high pressure location in the compressor.

Another feature of the present application further includes exchanging heat between the first portion and the second portion.

Yet another feature of the present application provides wherein the combining occurs upstream of the air particle separator.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine having a particle separator for cleaning an airflow and a compressor capable of increasing a pressure of a working fluid in the gas turbine engine, the particle separator having a clean flow path and a dirty flow path;

a first passageway for the conveyance of a first air flow extracted from a first source of the compressor;

a second passageway for the conveyance of a second air flow extracted from a second source of the compressor, the second source downstream of the first source; and a heat exchanger separately maintaining the first air flow and second air flow and constructed such that the first air flow cools the second air flow;

a passage that conveys a merged flow of a flow of dirty air from the dirty flow path of the particle separator and the first air flow extracted from the compressor, the passage structured to receive the merged flow from the first passageway downstream of the heat exchanger and the dirty flow path downstream of the particle separator; and a blower positioned at a downstream portion of the passage and structured to receive and convey onward the first air flow from the first source of the compressor and the flow of dirty air from the particle separator;

wherein the first air flow is extracted from the first source of the compressor at a first extraction location and the first air flow is merged with the flow of dirty air at a merger location, the merger location being downstream of the first extraction location;

wherein the gas turbine engine has an axial in-flow of an inlet air stream divided by the particle separator into the clean flow path and the dirty flow path.

2. The apparatus of claim 1, wherein the merger location of the first air flow with the dirty flow of air is upstream of the blower.

3. The apparatus of claim 1, wherein the compressor includes a relatively low pressure compressor section and a relatively high pressure compressor section.

4. The apparatus of claim 1, wherein the first passageway extends only downstream between the first extraction location and the merger location.

5. The apparatus of claim 1, wherein the heat exchanger is a coiled heat exchanger.

6. An apparatus comprising:

a gas turbine engine including a compressor, a turbine rotatable about a spool axis of the gas turbine engine, and a particle separator for cleaning an airflow, the compressor having a main compressor flow path, an upstream offtake, and a downstream offtake, wherein the upstream offtake is at a lower pressure than the downstream offtake, and the particle separator having a clean flow path and a dirty flow path;

a blower structured to rotate about a component axis that is not directly created by the rotation of the spool axis of the gas turbine engine, the blower operable to produce a component flow stream;

a heat exchanger structured to exchange heat between a first air stream from the upstream offtake and a second air stream from the downstream offtake;

a passage that conveys a merged flow of a flow of dirty air from the dirty flow path of the particle separator and the first air stream, the passage structured to receive the merged flow from the upstream offtake downstream of the heat exchanger and the dirty flow path downstream of the particle separator; and wherein during operation of the gas turbine engine the first air stream is attracted to be combined with the flow of dirty air upstream of the blower after the first air stream has passed through the heat exchanger;

wherein the first offtake extends only downstream between the compressor and the passage; and wherein the gas turbine engine has an axial in-flow of an inlet air stream divided by the particle separator into the clean flow path and the dirty flow path.

7. The apparatus of claim 6, wherein the gas turbine engine is a multi-spool gas engine, the compressor includes a relatively low pressure compressor component and a relatively high pressure compressor component, the relatively high pressure compressor component is a high pressure compressor of the multi-spool gas turbine engine, and wherein the gas turbine engine is coupled to a vehicle and provides energy to the vehicle.

8. The apparatus of claim 6, wherein the heat exchanger is a coiled heat exchanger.

9. A method comprising:

operating a gas turbine engine and generating a compressor flow from a compressor, the gas turbine engine having an axial in-flow of a flow stream;

parsing the flow stream with an air particle separator into a clean flow and a dirty flow;

extracting a first portion of air from the compressor at a relatively low pressure location in the compressor;

extracting a second portion of air from the compressor at a relatively high pressure location in the compressor;

exchanging heat between the first portion and the second portion;

combining the first portion with the dirty flow upstream of a blower; and exhausting the combined first portion and dirty flow overboard;

wherein the first portion of air is extracted from the compressor at a first extraction location and the first portion is combined with the dirty flow at a combined location, the combined location being downstream of the first extraction location.

10. The method of claim 9, wherein the exchanging of heat between the first portion and the second portion is achieved through a coiled heat exchanger.

\* \* \* \* \*